United States Patent
Abou Rjeily (10) Patent No.: US 8,165,194 B2
(45) Date of Patent: Apr. 24, 2012

(54) SPACE-TIME ENCODING METHOD FOR A MULTI-ANTENNA COMMUNICATION SYSTEM OF THE UWB PULSE TYPE

(75) Inventor: Chadi Abou Rjeily, Zahle (LB)

(73) Assignee: Commissariat a l'Energie Atomique, Paris (FR)

( * ) Notice: Subject to any disclaimer, the term of this patent is extended or adjusted under 35 U.S.C. 154(b) by 449 days.

(21) Appl. No.: 12/443,919

(22) PCT Filed: Oct. 2, 2007

(86) PCT No.: PCT/EP2007/060420
§ 371 (c)(1),
(2), (4) Date: Apr. 1, 2009

(87) PCT Pub. No.: WO2008/040716
PCT Pub. Date: Apr. 10, 2008

(65) Prior Publication Data
US 2010/0008403 A1   Jan. 14, 2010

(30) Foreign Application Priority Data
Oct. 3, 2006 (FR) .................................. 06 54060

(51) Int. Cl.
*H03K 7/04* (2006.01)
*H03K 7/06* (2006.01)
*H03K 9/04* (2006.01)
*H03K 9/06* (2006.01)

(52) U.S. Cl. ......... 375/239; 375/256; 375/259; 375/353

(58) Field of Classification Search .................. 375/130, 375/131, 138, 239, 256, 259–260, 353
See application file for complete search history.

(56) References Cited

U.S. PATENT DOCUMENTS

| | | | | |
|---|---|---|---|---|
| 5,155,697 A | * | 10/1992 | Bunsen | ........................ 708/137 |
| 2006/0182166 A1 | | 8/2006 | Abou Rjeily et al. | |
| 2007/0237209 A1 | | 10/2007 | Abou Rjeily | |
| 2008/0212720 A1 | | 9/2008 | Abou Rjeily | |
| 2008/0232455 A1 | | 9/2008 | Abou Rjeily | |
| 2009/0103589 A1 | | 4/2009 | Abou Rjeily | |
| 2010/0008404 A1 | * | 1/2010 | Abou Rjeily | ................. 375/141 |

OTHER PUBLICATIONS

Abou-Rjeily et al., "On High Data Rate Space-Time Codes for Ultra-Wideband Systems," IEEE conference on Ultra-Wideband, Sep. 2005.*

U.S. Appl. No. 12/863,990, filed Jul. 29, 2010, Abou Rjeily.

(Continued)

*Primary Examiner* — David C. Payne
*Assistant Examiner* — James M Perez
(74) *Attorney, Agent, or Firm* — Oblon, Spivak, McClelland, Maier & Neustadt, L.L.P.

(57) ABSTRACT

The present invention relates to a space-time coding method for a UWB transmission system comprising at least two radiated elements. This method codes a block of information symbols $S=(a_1, a_2 \ldots, a_{P^2})$) belonging to a 2-PPM modulation or 2-PPM-M'-PAM composite modulation alphabet with $M' \geq 2$, into a sequence of vectors $(s^{i,j}, \Omega s^{i,j})$, the components of a vector being intended to modulate a UWB pulse signal for a radiative element of said system and for a given transmission interval $(T_f)$.

8 Claims, 4 Drawing Sheets

OTHER PUBLICATIONS

Abou-Rjeily, C. et al., "Space-Time Coding for Multiuser Ultra-Wideband Communications" Interenet Citation, Retrieved from the Internet: URL:http://www.comelec.enst.fr/{belfiore/UWB_MIMO.pdf>, pp. 1-25 (Sep. 13, 2005) XP-008071459.

Abou-Rjeily, C. et al., "A New Family of Space-Time Cods for Pulse Amplitude and Position Modulated UWB Systems", Proceedings IEEE International Symposium of Information Theory, pp. 2829-2833 (Jul. 9, 2006) XP-008073212.

Lenstra, A. K. et al., "Factoring Polynomials with Rational Coefficients", Mathematische Annalen, vol. 261, pp. 515-534 (Jul. 11, 1982) XP-002421156.

U.S. Appl. No. 12/293,666, filed Sep. 19, 2008, Abou Rjeily.
U.S. Appl. No. 12/444,016, filed Apr. 2, 2009, Abou Rjeily.
U.S. Appl. No. 12/518,672, filed Jun. 11, 2009, Abou Rjeily.

* cited by examiner

FIG. 1

FIG. 2A
TH-UWB

FIG. 2B
DS-UWB

FIG. 2C
TH-DS-UWB

SPACE-TIME ENCODING METHOD FOR A MULTI-ANTENNA COMMUNICATION SYSTEM OF THE UWB PULSE TYPE

TECHNICAL FIELD

The present invention relates to both the field of ultra large band or UWB (Ultra Wide Band) telecommunications and that of multi-antenna space-time coding STC (Space Time Coding) systems.

STATE OF THE PRIOR ART

Wireless telecommunications systems of the multi-antenna type are well known from the state of the art. These systems use a plurality of antennas for emission and/or reception and are designated, according to the type of adopted configuration, as MIMO (Multiple Input Multiple Output), MISO (Multiple Input Single Output) or SIMO (Single Input Multiple Output) systems. In the following, we shall use the same term MIMO for covering the MIMO and MISO aforementioned alternatives. Exploitation of spatial diversity upon emission and/or reception allows these systems to provide significantly greater channel capacities than those of conventional mono-antenna (or SISO for Single Input Single Output) systems. This spatial diversity is generally completed by time diversity by means of space-time coding. In such a coding, an information symbol to be transmitted is encoded on several antennas and during several transmission instants. Two large categories of MIMO systems with space-time coding are known: the trellis coding or STTC (Space Time Trellis Coding) systems and block coding or STBC (Space Time Block Coding) systems. In a trellis coding system, the space-time encoder may be considered as a finite state machine providing P transmission symbols to P antennas depending on the current state and on the information symbol to be encoded. Decoding upon reception is achieved by a multidimensional Viterbi algorithm, the complexity of which increases exponentially as a function of the number of states. In a block coding system, a block of information symbols to be transmitted is encoded in a transmission symbol matrix, one dimension of the matrix corresponding to the number of antennas and the other one corresponding to the consecutive instants of transmission.

Figure 1:
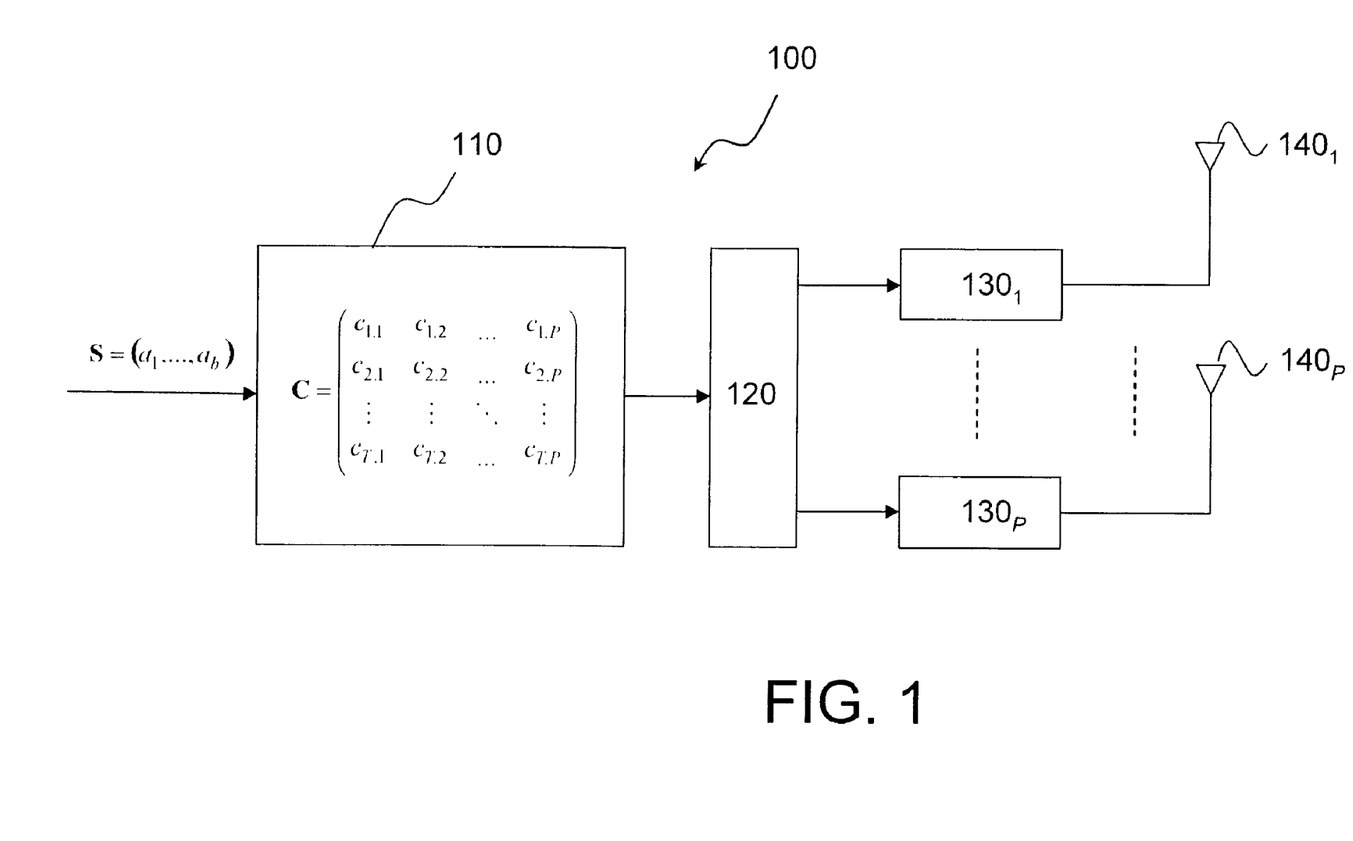
FIG. 1 schematically illustrates a MIMO transmission system with STBC coding as known from the state of the art.

FIG. 1 schematically illustrates a MIMO 100 transmission system with STBC coding. An information symbol block $S=(a_1, \ldots, a_b)$ for example a binary word of b bits or more generally b M-ary symbols is coded in a space-time matrix:

$$C = \begin{pmatrix} c_{1,1} & c_{1,2} & \cdots & c_{1,P} \\ c_{2,1} & c_{2,2} & \cdots & c_{2,P} \\ \vdots & \vdots & \ddots & \vdots \\ c_{T,1} & c_{T,2} & \cdots & c_{T,P} \end{pmatrix} \quad (1)$$

wherein the coefficients $c_{t,p}$, $t=1, \ldots, T$; $p=1, \ldots, P$ of the code are generally complex coefficients depending on the information symbols, P is the number of antennas used for emission, T is an integer indicating the time extension of the code, i.e. the number of instants of use of the channel or PCUs (Per Channel Use).

The function $f$ which provides a correspondence between any vector S of information symbols and the space-time code word C is called a coding function. If the function $f$ is linear it is said that the space-time code is linear. If the coefficients $c_{t,p}$ are real, the space-time code is said to be real.

In FIG. 1, a space-time coder is denoted as 110. At each instant t of use of the channel, the encoder provides the multiplexer 120 with the t-th row vector of the matrix C. The multiplexer transmits the coefficients of the row vector to the modulators $130_1, \ldots, 130_P$ and the modulated signals are transmitted by the antennas $140_1, \ldots, 140_P$.

The space-time code is characterized by its throughput rate i.e. by the number of information symbols that it transmits per instant of channel use (PCU). The code is said to be full rate if it is P times higher than the relative throughput rate for single antenna use (SISO).

The space-time code is further characterized by its diversity which may be defined as the rank of the matrix C. There will be maximum diversity if the matrix $C_1-C_2$ is full rank for any two arbitrary code words $C_1$ and $C_2$ corresponding to two vectors $S_1$ and $S_2$.

Finally, the space-time code is characterized by its coding gain which expresses the minimum distance between different code words. It may be defined as:

$$\min_{C_1 \neq C_2} \det((C_1 - C_2)^H (C_1 - C_2)) \quad (2)$$

or, equivalently, for a linear code:

$$\min_{C \neq 0} \det(C^H C) \quad (3)$$

wherein det(C) refers to the determinant of C and $C^H$ is the conjugate transpose matrix of C. The coding gain for a given transmission energy per information symbol, is limited.

As a general rule, the coding gain is not fixed but decreases with the order of the information modulation, the order on which spectral efficiency depends. In certain cases, when spectral efficiency increases, the coding gain does not tend to zero but towards an asymptotic non-zero value. Such a code is said to be without a non-vanishing determinant.

Finally, it is made sure that the average energy transmitted by the system is uniformly distributed between antennas and transmission instants.

A perfect code is called full rate code, with maximum diversity, without a non-vanishing determinant and with distributed energy in the sense above.

An example of such a space-time coding for a MIMO two antenna transmission system has been proposed in the article of J-C Belfiore et al. entitled <<The Golden code: a 2×2 full-rate space-time code with non-vanishing determinants>> published in IEEE Transactions on Information Theory, Vol. 51, No. 4, pages 1432-1436, April 2005.

The proposed code, a so-called golden code, is based on a dual algebraic extension K of the field of rational numbers Q: $K=Q(i,\theta)$ wherein $i=\sqrt{-1}$ is a root of the polynomial $X^2+1$ and $\theta$ is the golden number $$\theta = \frac{1+\sqrt{5}}{2},$$

a root of the polynomial $X^2-X-1$. The golden code may be represented by the following matrix:

$$C_{gold} = \begin{pmatrix} \alpha(a_1 + \theta a_2) & \alpha(a_3 + \theta a_4) \\ i\alpha_1(a_3 + \theta_1 a_4) & \alpha_1(a_1 + \theta_1 a_2) \end{pmatrix} \quad (4)$$

wherein $S=(a_1, a_2, a_3, a_4)$ is an information symbol vector. $a_1$, $a_2$, $a_3$, $a_4$ are complex symbols of a constellation $2^b$-QAM, a subset of $Z[i]$ wherein $Z$ is the ring of integers.

$$\theta_1 = \frac{1 + \sqrt{5}}{2}$$

is the conjugate root of $\theta$, $\alpha=1+i(1-\theta)$ and $\alpha_1=1+i(1-\theta_1)$.

Examples of perfect space-time codes for a MIMO system with 2,3,4 or 6 transmission antennas will be found in the article of Frédérique Oggier et al. entitled <<Perfect space time block codes>> submitted to publication in the IEEE Transactions on Information Theory and available at the www.comelec.enst.fr/~belfiore site.

Another field of telecommunications is actually the object of considerable research. This deals with UWB telecommunications systems, notably recommended for the development of future wireless personal area networks (WPAN). These systems have the specificity of directly working in a base band with very wide band signals. By UWB signal is generally meant a signal complying with the spectral mask stipulated in the FCC regulation as of Feb. 14, 2002 and reviewed in March 2005, i.e. essentially a signal in the spectral band from 3.1 to 10.6 GHz and having a −10 dB bandwidth of at least 500 MHz. In practice, two types of UWB signals are known, the multi-band OFDM (MB-OFDM) signals and the UWB signals of the pulse type. In the following, we are only interested in the latter.

A UWB pulse signal consists of very short pulses, typically of the order of a few hundred picoseconds, distributed within a frame. In order to reduce multiple access interference (MAI for Multiple Access Interference), a distinct time hopping code (TH for Time Hopping) is assigned to each user. The signal from or sent to a user k may then be written as follows:

$$s_k(t) = \sum_{n=0}^{N_s-1} w(t - nT_s - c_k(n)T_c) \quad (5)$$

wherein $w$ is the elementary pulse shape, $T_c$ is chip duration, $T_s$ is the duration of an elementary interval with $N_s=N_cT_c$ wherein $N_c$ is the number of chips in an interval, the total frame being of duration $T_f=N_sT_s$ wherein $N_s$ is the number of intervals in the frame. The elementary pulse duration is selected to be less than the chip duration, i.e. $T_w \leq T_c$. The sequence $c_k(n)$ for $n=0, \ldots, N_s-1$ defines the time hopping code of the user k. Time hopping sequences are selected so as to minimize the number of collisions between pulses belonging to time hopping sequences of different users.

Figure 2A:
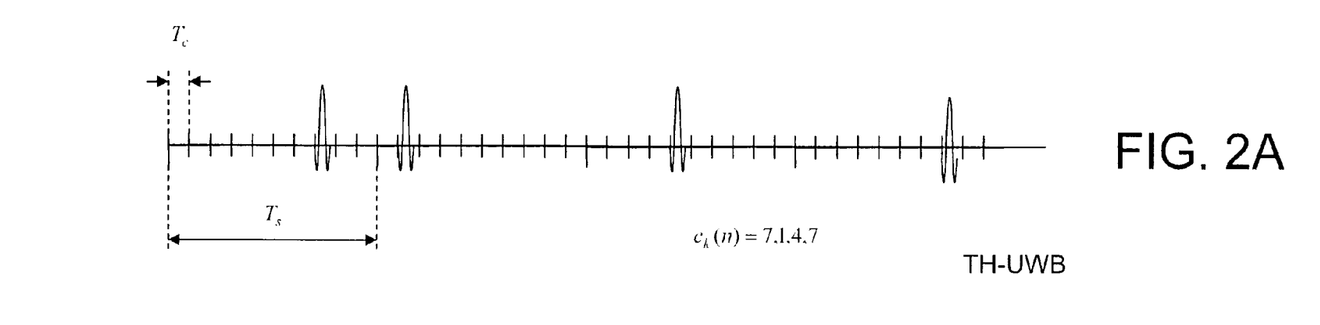
FIGS. 2A-2C illustrate respective shapes of TH-UWB, DS-UWB and TH-DS-UWB signals.

A TH-UWB signal associated with a user k is illustrated in FIG. 2A. In order to transmit a given information symbol from or to a user k, the TH-UWB signal is generally modulated with a position modulation (PPM for Pulse Position Modulation), i.e. for the modulated signal:

$$s_k(t) = \sum_{n=0}^{N_s-1} w(t - nT_s - c_k(n)T_c - d_k\varepsilon) \quad (6)$$

wherein $\varepsilon$ is a modulation dither substantially less than the chip duration $T_c$ and $d_k \in \{0, \ldots, M-1\}$ is the M-ary PPM position of the symbol.

Alternatively, the information symbols may be transmitted by means of amplitude modulation (PAM). In this case, the modulated signal may be written as:

$$s_k(t) = \sum_{n=0}^{N_s-1} a^{(k)} \cdot w(t - nT_s - c_k(n)T_c) \quad (7)$$

wherein $a^{(k)}=2m'-1-M'$ with $m'=1, \ldots, M'$, is the M'-ary symbol of the PAM modulation. For example, a BPSK modulation (M'=2) may be used.

The PPM and PAM modulations may be combined into a single M.M'-ary composite modulation, conventionally designated as M-PPM-M'-PAM. Le modulated signal then has the following general form:

$$s_k(t) = \sum_{n=0}^{N_s-1} \sum_{m=0}^{M-1} a_m^{(k)} \cdot w(t - nT_s - c_k(n)T_c - m\varepsilon) \quad (8)$$

Figure 3:
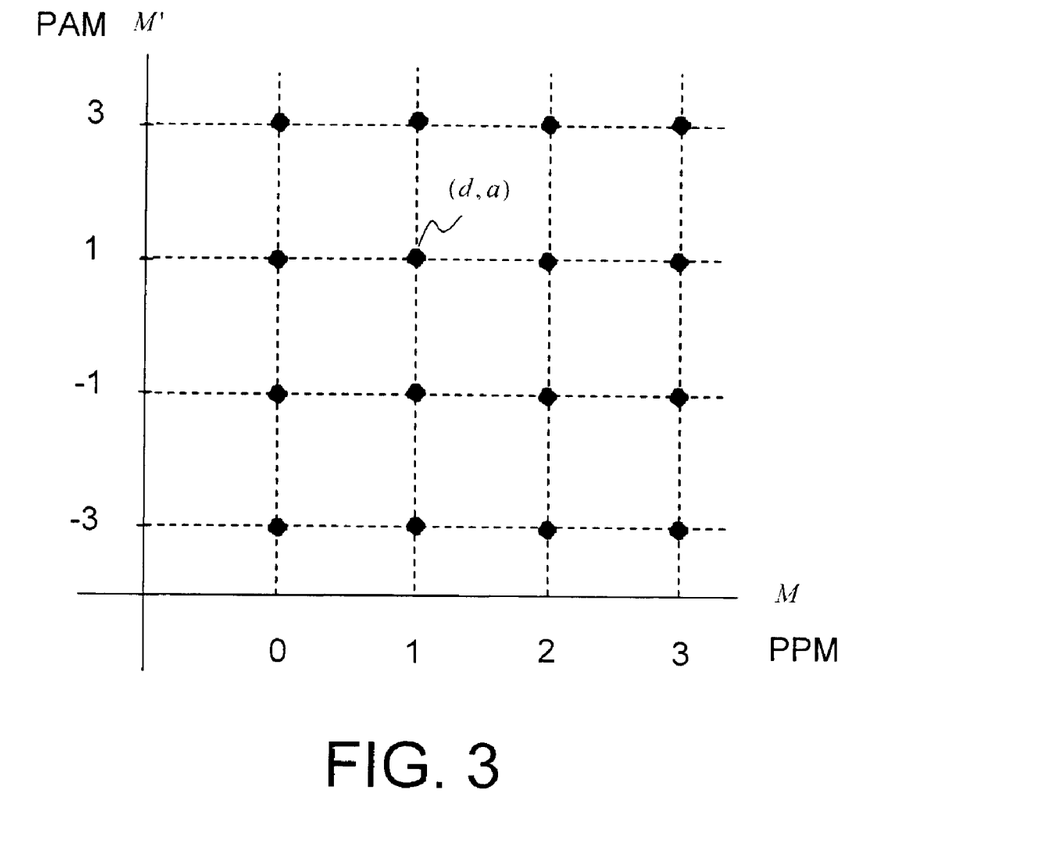
FIG. 3 illustrates an exemplary constellation of a PPM-PAM modulation.

The alphabet of this cardinal M.M' modulation was illustrated in FIG. 3. For each of the M positions, M' modulation amplitudes are possible. A symbol (d,a) of the alphabet may be represented by a sequence $a_m$, $m=0, \ldots, M-1$ with $a_m=\delta(m-d)a$ wherein d is a position of the PPM population, a is a PAM modulation amplitude and $\delta(.)$ is the Dirac distribution.

Figure 2B:
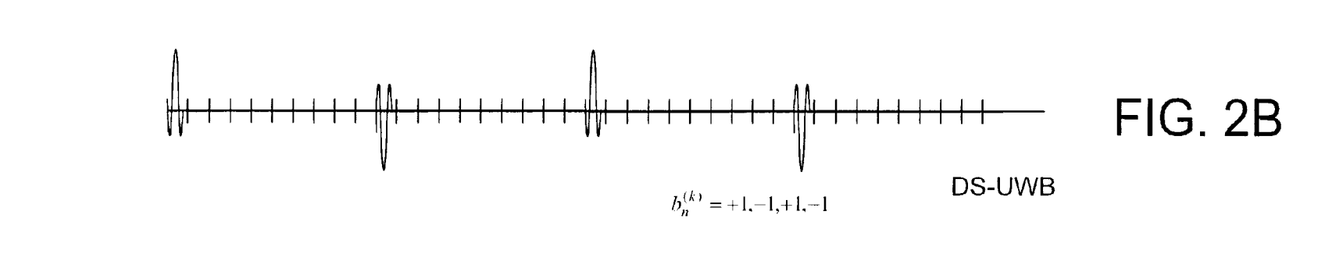

Instead of separating the different users by means of time hopping codes, it is also possible to separate them by orthogonal codes, for example Hadamard codes, such as in DS-CDMA. This is then termed DS-UWB (Direct Spread UWB). In this case, the expression of the non-modulated signal corresponding to (5) is:

$$s_k(t) = \sum_{n=0}^{N_s-1} b_n^{(k)} w(t - nT_s) \quad (9)$$

wherein $b_n^{(k)}$, $n=0, \ldots, N_s-1$ is the spread sequence of user k. It is noted that the expression (9) is similar to that of a conventional DS-CDMA signal. However, it differs therefrom by the fact that the chips do not occupy the whole frame but are distributed to the period $T_s$. A DS-UWB signal associated with a user k is illustrated in FIG. 2B.

As earlier, the information symbols may be transmitted by means of a PPM modulation, a PAM modulation or a composite M-PPM-M'-PAM modulation. The amplitude-modulated DS-UWB signal corresponding to the TH-UWB signal (7) may be expressed as, while retaining the same notations:

$$s_k(t) = \sum_{n=0}^{N_s-1} a^{(k)} b_n^{(k)} \cdot w(t - nT_s) \quad (10)$$

Finally, it is known how to combine time hopping codes and spectral spread codes in order to provide multiple accesses to different users. A TH-DS-UWB pulse UWB signal is thereby obtained with the general form:

$$s_k(t) = \sum_{n=0}^{N_s-1} b_n^{(k)} \cdot w(t - nT_s - c_k(n)T_c) \quad (11)$$

Figure 2C:
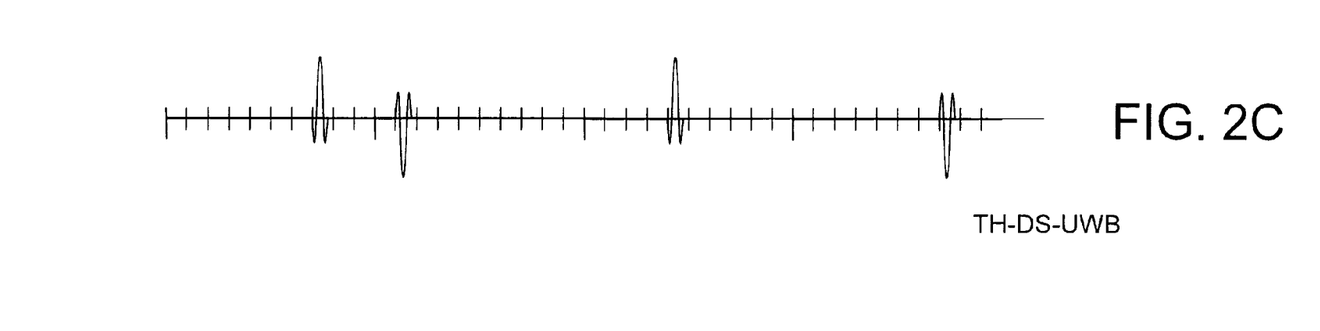

A TH-DS-UWB signal associated with a user k is illustrated in FIG. 2C. This signal may be modulated by an M-PPM-M'PAM composite modulation. One then obtains for the modulation signal:

$$s_k(t) = \sum_{n=0}^{N_s-1} \sum_{m=0}^{M-1} a_m^{(k)} b_n^{(k)} \cdot w(t - nT_s - c_k(n)T_c - m\varepsilon) \quad (12)$$

The use of UWB signals in MIMO systems is known from the state of the art. In this case, each antenna transmits an UWB signal, modulated as a function of an information symbol or of a block of such symbols (STBC).

Space-time coding techniques initially developed for narrow band signals or for DS-CDMA are poorly applied to UWB pulse signals. Indeed, known space-time codes, such as the golden code, are generally complex coefficients, and therefore convey phase information. Now, it is excessively difficult to recover this phase information in a signal with a band as wide as that of UWB pulse signals. The very narrow time support of the pulses lends itself to position modulation (PPM) or amplitude modulation (PAM) much better.

A space-time coding of UWB signals was proposed in the article of Chadi Abou-Rjeily et al. entitled <<Space-Time coding for multiuser Ultra-Wideband communications>> submitted for publication in the IEEE Transactions on Communications, September 2005 and available at www.tsi.enst.fr.

According to the constraints posed above, the proposed space-time code is real. For example for a configuration with two emission antennas, the code may be written as:

$$C = \begin{pmatrix} \beta(a_1 + \theta a_2) & \sqrt{2}\beta(a_3 + \theta a_4) \\ \sqrt{2}\beta_1(a_3 + \theta_1 a_4) & \beta_1(a_1 + \theta_1 a_2) \end{pmatrix} \quad (13)$$

with $$\beta = \frac{1}{\sqrt{1+\theta^2}} \text{ and } \beta_1 = \frac{1}{\sqrt{1+\theta_1^2}};$$

$$S = (a_1, a_2, a_3, a_4)$$

is a vector of PAM information symbols, i.e. $a_i \in \{-M'+1, \ldots, M'-1\}$.

In this same article, it is suggested that this space-time code be generalized to the coding of a block of information symbols belonging to a PPM-PAM alphabet. For a configuration with two emission antennas, this code may be expressed by the matrix of size 2M×2:

$$C = \begin{pmatrix} \beta(a_{1,0} + \theta a_{2,0}) & \sqrt{2}\beta(a_{3,0} + \theta a_{4,0}) \\ \vdots & \vdots \\ \beta(a_{1,M-1} + \theta a_{2,M-1}) & \sqrt{2}\beta(a_{3,M-1} + \theta a_{4,M-1}) \\ \sqrt{2}\beta_1(a_{3,0} + \theta_1 a_{4,0}) & \beta_1(a_{1,0} + \theta_1 a_{2,0}) \\ \vdots & \vdots \\ \sqrt{2}\beta_1(a_{3,M-1} + \theta_1 a_{4,M-1}) & \beta_1(a_{1,M-1} + \theta_1 a_{2,M-1}) \end{pmatrix} \quad (14)$$

Each information symbol $a_i = (a_{i,0}, \ldots, a_{1,M-1})$ is here a vector representing an element of the M-PPM-M'-PAM alphabet with $a_{i,m} = a_i \delta(m - d_i)$ wherein $a_i$ is an element of the M-PAM and $d_i$ of the M'-PPM alphabet. The block of information symbols coded by the code C is none other than $S = (a_1, a_2, a_3, a_4)$.

More specifically, the block of information symbols S gives rise to the generation of UWB signals according to the expressions given hereafter. A single-user usage is assumed in order to simplify notations (no indexation by k, nor spread sequence).

Antenna 1 transmits during the duration of the first frame $T_f$ the signal:

$$s^1(t) = \beta \sum_{n=0}^{N_s-1} \sum_{m=0}^{M-1} (a_{1,m} + \theta a_{2,m}) w(t - nT_s - c(n)T_c - m\varepsilon) \quad (15)$$

a signal which corresponds to the first column vector of the first M lines of the code (14).

Antenna 2 simultaneously transmits during the duration of the first frame $T_f$ the signal:

$$s^2(t) = \beta\sqrt{2} \sum_{n=0}^{N_s-1} \sum_{m=0}^{M-1} (a_{3,m} + \theta a_{4,m}) w(t - nT_s - c(n)T_c - m\varepsilon) \quad (16)$$

a signal which corresponds to the second column vector of the first M lines of the code.

Antenna 1 then transmits during the duration of the second frame, again taking the origin of times as the beginning of the frame:

$$s^1(t) = \beta_1\sqrt{2} \sum_{n=0}^{N_s-1} \sum_{m=0}^{M-1} (a_{3,m} + \theta a_{4,m}) w(t - nT_s - c(n)T_c - m\varepsilon) \quad (17)$$

a signal which corresponds to the first column vector of the last M lines of the code.

Finally antenna 2 simultaneously transmits during the duration of the second frame, the signal:

$$s^2(t) = \beta_1 \sum_{n=0}^{N_s-1} \sum_{m=0}^{M-1} (a_{1,m} + \theta a_{2,m}) w(t - nT_s - c(n)T_c - m\varepsilon) \quad (18)$$

a signal which corresponds to the second column vector of the last M lines of the code.

The space-time code as defined above has very good performances in terms of diversity. However, its coding gain is less than that of the (golden code as defined by (4). Further, the scalar term $\sqrt{2}$ appearing in the matrix (14) creates at each frame, energy unbalance among the antennas.

An object of the present invention is to propose a real space-time code for a MIMO system with UWB pulse signals which has a coding gain above that of the aforementioned real space-time code. Another object of the present invention is to provide a real space-time code which may be applied to a MIMO system with any number of antennas. Finally, another object of the present invention is to propose a space-time code having at each frame a uniform distribution of energy over the different antennas.

DISCUSSION OF THE INVENTION

The present invention is defined by a space-time coding method for a UWB transmission system comprising at least two radiative elements, said method encoding a block of information symbols ($S=(a_1, a_2 \ldots, a_{P^2})$) belonging to an 2-PPM modulation or 2-PPM-M'-PAM composite modulation alphabet with $M' \geq 2$, into a sequence of vectors ($s^{i,j}, \Omega s^{i,j}$), the components of a vector being intended to modulate a UWB pulse signal for a radiative element of said system and for a given transmission interval ($T_f$). Said vectors are defined as the elements of the matrix:

$$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix}$$

defined to within one permutation of its lines and/or its columns, one line corresponding to a transmission interval and one column to a radiative element, wherein
$\Omega$ is a $\pm\pi/2$ rotation matrix, P is the number of radiative elements and $$s^{i,j} = (R_j \otimes I_2) \begin{pmatrix} a_{(i-1)P+1} \\ a_{(i-1)P+P} \\ \vdots \\ a_{iP} \end{pmatrix}$$

to within a ±10% margin, where $I_2$ is the identity matrix of size 2×2. $\otimes$ is the tensor product, $a_l$, $l=1, \ldots, P^2$ are information symbols, $R_j$ is a line vector of dimension P corresponding to the $j^{th}$ line of an orthogonal matrix R generating the lattice of points $\Lambda = \{u\Theta | u \in Z^P\}$ with $$\Theta = \begin{pmatrix} 1 & \theta_0 & \ldots & \theta_0^{P-1} \\ 1 & \theta_1 & \ldots & \theta_1^{P-1} \\ \vdots & \vdots & \ldots & \vdots \\ 1 & \theta_{P-1} & \ldots & \theta_{P-1}^{P-1} \end{pmatrix}$$

wherein $\theta_p$, $p=0, \ldots, P-1$ are P distinct real roots of a polynomial of degree P with rational coefficients.

According to an alternative, the orthogonal matrix is expressed as $R=\Theta V$ wherein V is a matrix, the columns of which are formed by vectors $v^{(p)}=(v_0^{(p)}, v_1^{(p)}, \ldots, v_{P-1}^{(p)})^T$ $p=0, \ldots, P-1$, the coefficients of which are rational.

The invention also relates to a method for transmitting a plurality of information symbols belonging to a 2-PPM modulation or 2-PPM-M'-PAM composite modulation alphabet with $M' \geq 2$. According to this transmission method, said information symbols are coded by means of the space-time coding defined above in order to provide $P^2$ vectors of dimension 2, elements of said matrix C, the components of each of these vectors modulating the position or else the position and amplitude of the pulses making up a UWB pulse signal, in order to obtain $P^2$ corresponding modulated UWB pulse signals, the signals being respectively transmitted by the P radiative elements during P transmission intervals.

The radiative elements may be UWB antennas, laser diodes or light-emitting diodes.

The pulse signal will advantageously be a TH-UWB signal, a DS-UWB signal or further a TH-DS-UWB signal.

SHORT DESCRIPTION OF THE DRAWINGS

Other features and advantages of the invention will become apparent upon reading through a preferential embodiment of the invention made with reference to the appended figures wherein.

DETAILED DISCUSSION OF PARTICULAR EMBODIMENTS

The idea on which the invention is based, is to create a space-time code which gets rid of both complex values $\alpha$ and $\alpha_1$ appearing in the golden code (4), incompatible, as already stated with the use of UWB pulse signals, and of scalars $\sqrt{2}$ appearing in the codes (13) and (14), at the origin of an unbalanced distribution of energy on the antennas.

The proposed space-time code is applied to MIMO systems with any number P of transmission antennas using UWB pulse signals in which the information symbols are elements:
- of a 2-PPM-M'-PAM modulation for a bi-antenna MIMO system (P=2) with $M' \geq 1$;
- of a 2-PPM modulation for a MIMO system with more than two transmission antennas (P>2).

The proposed code is represented by the matrix of size 2P×P $$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix} \quad (19)$$

wherein the terms $s^{i,j}$, $i=1, \ldots, P$, $j=1, \ldots, P$ are vectors of dimension 2, the components of which will be specified later on and $\Omega$ is a $\pm\pi/2$ rotation matrix, i.e.:

$$\Omega = \begin{pmatrix} 0 & -1 \\ 1 & 0 \end{pmatrix} \text{ or } \Omega = \begin{pmatrix} 0 & 1 \\ -1 & 0 \end{pmatrix} \quad (20)$$

The vectors $s^{i,j}$ are obtained in the following way:

$$s^{i,j} = (R_j \otimes I_2) \begin{pmatrix} a_{(i-1)P+1} \\ a_{(i-1)P+P} \\ \vdots \\ a_{iP} \end{pmatrix} \quad (21)$$

wherein $I_2$ is the identity matrix of size 2×2, ⊗ is the tensor (or Kronecker) product and the terms $a_l$, $l=1, \ldots, P^2$ are vectors of dimension 2 representing the $P^2$ information symbols to be coded. It is recalled that these symbols are elements of a 2-PPM-M'-PAM or 2-PPM modulation constellation, depending on whether $$P = 2 \text{ or } P > 2, \text{ i.e. } a_\ell = \begin{pmatrix} a_{0,\ell} \\ a_{1,\ell} \end{pmatrix}$$

wherein one of the terms $a_{0,l}$ and $a_{1,l}$ is equal to 0 and the other one is an M'-PPM modulation symbol in the first case, and equal to 1 in the second case. $R_j$ is the line vector of size 1×P corresponding to the $j^{th}$ line of the following matrix R:

$$R = \begin{pmatrix} \sum_{p=0}^{P-1} v_p^{(0)} \theta_0^p & \sum_{p=0}^{P-1} v_p^{(1)} \theta_0^p & \cdots & \sum_{p=0}^{P-1} v_p^{(P-1)} \theta_0^p \\ \sum_{p=0}^{P-1} v_p^{(0)} \theta_1^p & \sum_{p=0}^{P-1} v_p^{(1)} \theta_1^p & \cdots & \sum_{p=0}^{P-1} v_p^{(P-1)} \theta_1^p \\ \vdots & \vdots & \vdots & \vdots \\ \sum_{p=0}^{P-1} v_p^{(0)} \theta_{P-1}^p & \sum_{p=0}^{P-1} v_p^{(1)} \theta_{P-1}^p & \cdots & \sum_{p=0}^{P-1} v_p^{(P-1)} \theta_{P-1}^p \end{pmatrix} \quad (22)$$

wherein the terms $v_p^{(q)}$ for $p=0, \ldots, P-1$ and $q=0, \ldots, P-1$ are rational numbers and the terms $\theta_p$, $p=0, \ldots, P-1$ are distinct real numbers, roots of a polynomial $f(X)$ of degree P with rational coefficients, which may selected to be unitary, i.e.:

$$f(X) = \sum_{k=0}^{P} f_k X^k \quad (23)$$

wherein $f_k \in Q$, $k=0, \ldots, P-1$ and $f_P = 1$.

The matrix R is selected to be orthogonal, i.e. $RR^T = I_P$ wherein $I_P$ is the unit matrix of size P×P.

It is noted that R=ΘV wherein Θ is the Vandermonde matrix:

$$\Theta = \begin{pmatrix} 1 & \theta_0 & \cdots & \theta_0^{P-1} \\ 1 & \theta_1 & \cdots & \theta_1^{P-1} \\ \vdots & \vdots & \cdots & \vdots \\ 1 & \theta_{P-1} & \cdots & \theta_{P-1}^{P-1} \end{pmatrix} \quad (24)$$

and V is the matrix, the columns of which consist of the vectors $v^{(p)} = (v_0^{(p)}, v_1^{(p)}, \ldots, v_{P-1}^{(p)})^T$.

If the lattice of points $\Lambda = L(\Theta)$ of dimension P generated by the base consisting of the column vectors of Θ, i.e.: $\Lambda = \{u\Theta | u \in Z^P\}$ is considered, the determination of the matrix R amounts to searching for an orthogonal base of Λ. The latter may be obtained for example by means of the Lenstra-Lovász-Lenstra algorithm, also called LLL, a description of which will be found in the article of A. K. Lenstra et al. entitled <<Factoring polynomials with rational coefficients>> published in 1982 in Math. Ann. Vol. 261, pages 515-534. Examples of rotation matrices R will be found in the article of E. Bayer-Fluckiger et al. entitled <<New algebraic constructions of rotated $Z^n$-lattice constellations for the Rayleigh fading channel>> published in the IEEE Transactions on Information Theory, Vol. 50, No. 4, 2004, pages 702-714.

As this may be seen from the expression (22), the matrix R is real and therefore the space-time code matrix C defined in (19) is also real. Also, given the orthogonal nature of matrix R, the distribution of energy of the space-time code over the different antennas is uniform. Additionally, the space-time code C enables $P^2$ information symbols to be coded while using P antennas and P channel usages (PCU). It is therefore with maximum throughput rate.

It may be shown that the code is with maximum diversity $\forall P \geq 2$.

Finally, it may also be shown that for a bi-antenna MIMO system (P=2) it has the same coding gain as perfect codes, for 2-PPM and 2-PPM-M'-PAM modulations avec M'=2,4,8, and that for a MIMO system with more than two antennas (P>2), it has the same coding gain as perfect codes for a 2-PPM modulation.

It is important to note that a permutation of the lines and/or columns of matrix C does not affect the properties of the space-time code. Indeed, a permutation of columns amounts to a simple permutation of the antennas and a line permutation (here a line is understood as a line of vectors of dimension 2) amounts to a simple permutation of the instants of use of the channel.

In practice, the elements of matrix C are quantified as digital elements. However, one was able to see that an error of quantification of less than 10% by excess or default did not substantially affect the performances of the code.

Figure 4:
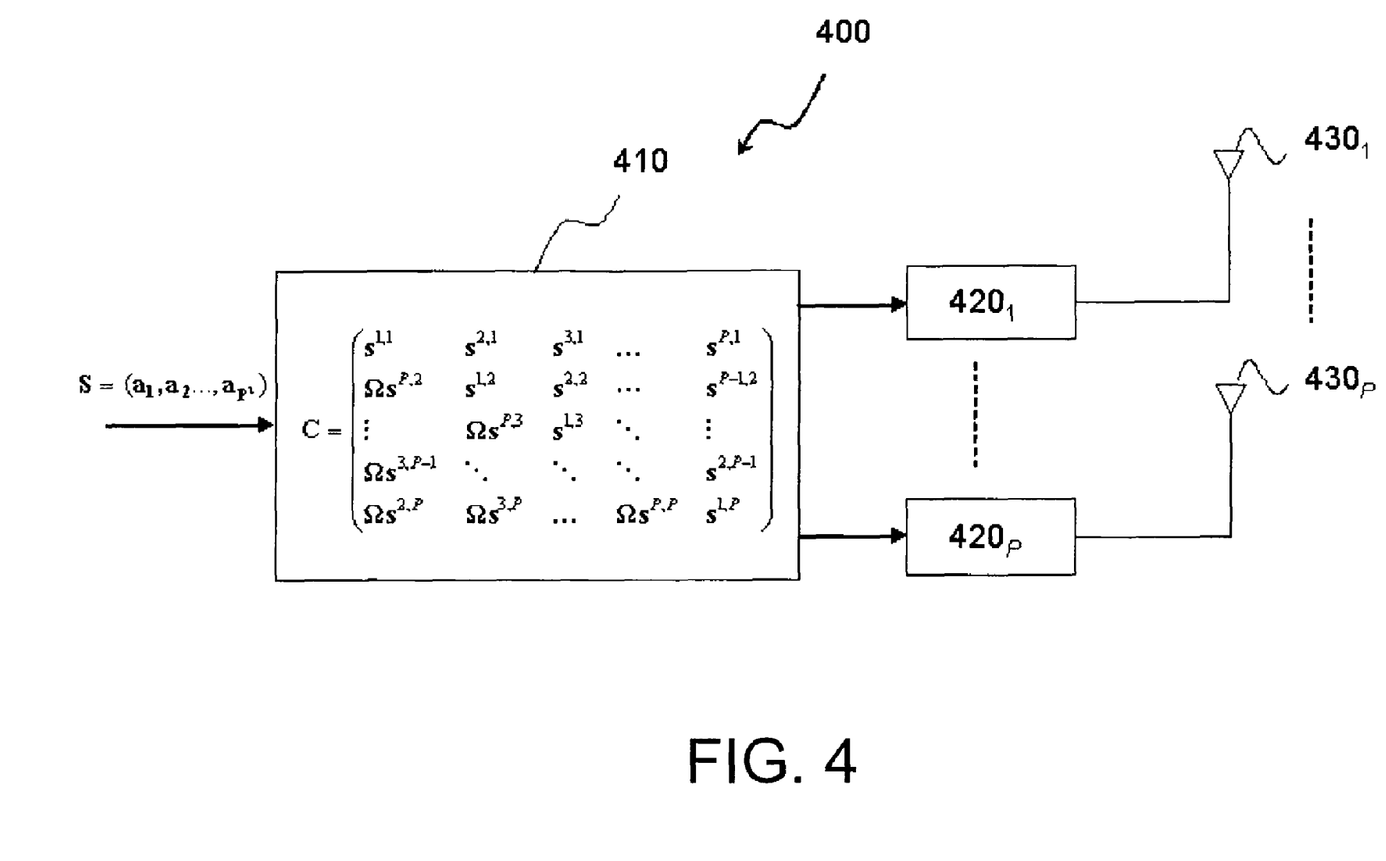
FIG. 4 schematically illustrates a MIMO transmission system using the space-time coding according to the invention.

FIG. 4 illustrates an exemplary transmission system using the space-time code according to the invention.

The system 400 receives information symbols by block $S = (a_1, a_2, \ldots, a_{P^2})$ wherein the symbols $a_l$, $l=1, \ldots P^2$ are vectors of dimension 2 illustrating elements of a 2-PPM ou 2-PPM-M'-PAM modulation constellation. Alternatively the information symbols may stem from an 2.M'-ary constellation provided that they are subject beforehand to transcoding (mapping) in a 2-PPM-M'-PAM constellation. Of course, the information symbols may stem from one or more operations well-known to one skilled in the art such as source coding, channel coding of the convolutional type, per block or else even series or parallel turbocoding, interleaving, etc.

The block of information symbols is subject to a coding operation in the space-time encoder 410. More specifically, the module 410 calculates the terms of the matrix C according to (19) or one of the aforementioned alternatives.

The P column vectors forming the first line C are first respectively transmitted to the UWB modulators $420_1, \ldots, 420_P$, for the first frame, and then the P column vectors forming the second line, for the second frame and so forth until transmission of the P column vectors of the last line C, for the $P^{th}$ frame.

Each column vector has two components corresponding to the two positions of PPM modulation. The UWB modulators $420_1, \ldots, 420_P$ generate from the column vectors which they receive, the corresponding modulated UWB pulse signals. Generally, the UWB pulse signals being used as a support for the modulation may be of the TH-UWB, DS-UWB or TH-DS-UWB type. For example, for a UWB modulator $420_P$, of the TH-UWB type, associated with the $p^{th}$ column of the matrix, the modulated UWB pulse signal for the first transmission interval will be (cf. equation 8):

$$s^P(t) = \beta_1 \sum_{n=0}^{N_s-1} s_0^{p,1} w(t - nT_s - c(n)T_c) + s_1^{p,1} w(t - nT_s - c(n)T_c - \varepsilon) \quad (25)$$

wherein $S_0^{P,1}$ et $S_1^{P,1}$ are the PAM components of the vector $s^{p,1}$.

The thereby modulated UWB pulse signals are then transmitted to the radiated elements $430_1$ to $430_P$. These radiated elements may be UWB antennas or laser diodes or LEDs for example operating in the infrared domain, associated with electro-optical modulators. The proposed transmission system may then be used in the field of wireless optical telecommunications.

The UWB signals transmitted by the system illustrated in FIG. 4 may be processed by a multi-antenna receiver in a standard way. The receiver may for example comprise a Rake type correlation stage followed by a decision stage, for example using a sphere decoder known to one skilled in the art.

The invention claimed is:

1. A space-time coding method for an Ultra Wide Band (UWB) transmission system comprising at least two radiative elements, said method comprising:
   coding a block of information symbols ($S=(a_1, a_2 \ldots, a_{P^2})$) belonging to a 2-PPM (Pulse Position Modulation) modulation or 2-PPM-M'-PAM (Pulse Amplitude Modulation) composite modulation alphabet with M'≧2, into a sequence of vectors ($s^{i,j}, \Omega s^{i,j}$), the components of a vector being intended to modulate a UWB pulse signal for a radiative element of said system and for a given transmission interval ($T_f$), wherein said vectors are defined as the elements of the matrix:

$$C = \begin{pmatrix} s^{1,1} & s^{2,1} & s^{3,1} & \ldots & s^{P,1} \\ \Omega s^{P,2} & s^{1,2} & s^{2,2} & \ldots & s^{P-1,2} \\ \vdots & \Omega s^{P,3} & s^{1,3} & \ddots & \vdots \\ \Omega s^{3,P-1} & \ddots & \ddots & \ddots & s^{2,P-1} \\ \Omega s^{2,P} & \Omega s^{3,P} & \ldots & \Omega s^{P,P} & s^{1,P} \end{pmatrix}$$

defined to within one permutation of its lines and/or its columns, one line corresponding to a transmission interval and one column to a radiative element, wherein $\Omega$ is a $\pm\pi/2$ rotation matrix, P is the number of radiative elements and $$s^{i,j} = (R_j \otimes I_2) \begin{pmatrix} a_{(i-1)P+1} \\ a_{(i-1)P+P} \\ \vdots \\ a_{iP} \end{pmatrix}$$

to within a ±10% margin, where $I_2$ is the identity matrix of size 2×2, $\otimes$ is the tensor product, $a_l$, $l=1, \ldots, P^2$ are information symbols, $R_j$ is a line vector of dimension P corresponding to the $j^{th}$ line of an orthogonal matrix R generating the lattice of points $\Lambda = \{u\Theta | u \in X^P\}$ with $$\Theta = \begin{pmatrix} 1 & \theta_0 & \ldots & \theta_0^{P-1} \\ 1 & \theta_1 & \ldots & \theta_1^{P-1} \\ \vdots & \vdots & \ldots & \vdots \\ 1 & \theta_{P-1} & \ldots & \theta_{P-1}^{P-1} \end{pmatrix}$$

and wherein $\theta_p$, $p=0, \ldots, P-1$ are P distinct real roots of a polynomial of degree P with rational coefficients.

2. The space-time coding method according to claim 1, wherein the orthogonal matrix is expressed as $R=\Theta V$ wherein V is a matrix, the columns of which are formed by vectors $v^{(p)} = (v_0^{(p)}, v_1^{(p)}, \ldots, v_{P-1}^{(p)})^T$ $p=0, \ldots, P-1$, the coefficients of which are rational.

3. A method for transmitting a plurality of information symbols belonging to a 2-PPM modulation or 2-PPM-M'-PAM modulation alphabet with M'≧2, characterized in that said information symbols are coded by means of the space-time coding according to claim 1 or 2 in order to provide $P^2$ vectors of dimension 2, elements of said matrix C, the components of each of the vectors modulating the position or else the position and amplitude of the pulses making up each UWB pulse signal, in order to obtain $P^2$ corresponding modulated UWB pulse signals, the signals being respectively transmitted by the P radiative elements during P transmission intervals.

4. The transmission method according to claim 3, wherein the radiative elements are UWB antennas.

5. The transmission method according to claim 3, wherein the radiative elements are laser diodes or light-emitting diodes.

6. The method according to claim 3, wherein said pulse signal is a Time Hopping Ultra Wide Band signal.

7. The method according to claim 3, wherein said pulse signal is a Direct Spread Ultra Wide Band signal.

8. The method according to claim 3, wherein said pulse signal is a Time Hopping Direct Spread Ultra Wide Band signal.

* * * * *